(12) United States Patent
Duan et al.

(10) Patent No.: US 10,669,357 B2
(45) Date of Patent: Jun. 2, 2020

(54) POLYVINYL BUTYRAL-G-POLYLACTIDE COPOLYMER

(71) Applicant: PolyOne Corporation, Avon Lake, OH (US)

(72) Inventors: Yannan Duan, Westlake, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 122 days.

(21) Appl. No.: 15/754,853

(22) PCT Filed: Aug. 22, 2016

(86) PCT No.: PCT/US2016/048033
§ 371 (c)(1),
(2) Date: Feb. 23, 2018

(87) PCT Pub. No.: WO2017/035070
PCT Pub. Date: Mar. 2, 2017

(65) Prior Publication Data
US 2018/0223011 A1   Aug. 9, 2018

Related U.S. Application Data (60) Provisional application No. 62/210,870, filed on Aug. 27, 2015.

(51) Int. Cl.
| | | |
|---|---|---|
| C08F 8/16 | (2006.01) | |
| C08F 8/28 | (2006.01) | |
| C08F 216/34 | (2006.01) | |
| C08G 63/08 | (2006.01) | |
| C08J 5/18 | (2006.01) | |

(52) U.S. Cl.
CPC .......... C08F 8/16 (2013.01); C08F 8/28 (2013.01); C08F 216/34 (2013.01); C08G 63/08 (2013.01); C08J 5/18 (2013.01); *C08J 2329/14* (2013.01)

(58) Field of Classification Search
None
See application file for complete search history.

(56) References Cited

U.S. PATENT DOCUMENTS

| | | |
|---|---|---|
| 5,952,433 A | 9/1999 | Wang et al. |
| 6,075,118 A | 6/2000 | Wang et al. |
| 6,605,681 B1 | 8/2003 | Villalobos et al. |
| 6,984,694 B2 | 1/2006 | Blasius, Jr. et al. |
| 2004/0138381 A1* | 7/2004 | Blasius, Jr. ........... C08F 220/32 525/131 |

FOREIGN PATENT DOCUMENTS

| | | |
|---|---|---|
| JP | 2014-001372 A | 1/2014 |
| WO | 2014/093624 A1 | 6/2014 |

OTHER PUBLICATIONS

Machine translation of Azusa, JP 2014-001372, Jan. 9, 2014, p. 1-10.*
Butvar® PVB Technical Literature (2013).
Dong, H. et al., "The synthesis of biodegradable graft copolymer cellulose-graft-poly(L-lactide) and the study of its controlled drug release." Colloids and Surfaces B: Biointerfaces, 2008, vol. 66, No. 1, pp. 26-33.
Khurma, J. R. et al., "Miscibility study of solution cast blends of poly(lactic acid) and poly(vinyl butyral)." The South Pacific Journal of Natural and Applied Sciences, 2005, vol. 23, No. 1, pp. 22-25.
NatureWorks LLC, Ingeo™ Biopolymer 4060D Technical Data Sheet (2013).
Ni, C. et al., "Synthesis of poly(vinyl alcohol-graft-lactic acid) copolymer and its application as medical anti-tissue adhesion thin film." Polymer Bulletin, Mar. 18, 2015, (Online), vol. 72, No. 6, pp. 1515-1529.
Nuttelman, C. R. et al., "Synthesis and characterization of photocrosslinkable, degradable poly(vinyl alcohol)-based tissue engineering scaffolds." Biomaterials, 2002, vol. 23, No. 17, pp. 3617-3626.
Tripathy, A. R. et al., "Novel poly(butylene terephthalate)/poly(vinyl butyral) blends prepared by in situ polymerization of cyclic poly(butylene terephthalate) oligomers", Polymer 44 (2003) 1835-1842.

* cited by examiner

*Primary Examiner* — Robert T Butcher
(74) *Attorney, Agent, or Firm* — John H. Hornickel; Michael J. Sambrook (57) ABSTRACT

Copolymers of a polyvinyl butyral backbone with polylactic acid grafts and their compounds are disclosed, which can be used to produce clear, flexible and ductile bio-based films. The copolymers are amorphous and have been shown to maintain clarity, flexibility, and ductility after continuous exposure to thermal aging at 80° C. for one week.

18 Claims, 3 Drawing Sheets

POLYVINYL BUTYRAL-G-POLYLACTIDE COPOLYMER

CLAIM OF PRIORITY

This application claims priority from U.S. Provisional Patent Application Ser. No. 62/210,870 filed on Aug. 27, 2015, which is incorporated by reference.

FIELD OF THE INVENTION

This invention relates to synthesis of copolymers of polyvinyl butyral (PVB) and polymerized lactide monomer, compounds of those copolymers, and the copolymer or its compounds used for clear bio-based films, sheets, fibers or tapes. The copolymers and their compounds can also be flexible and can maintain clarity after exposure to thermal aging at 80° C. for one week.

BACKGROUND OF THE INVENTION

Plastic articles have replaced glass, metal, and wood articles, because plastic can be engineered to not shatter, rust, or rot. The durability of plastic articles also creates a disposal dilemma. In addition, many plastic resins are made from petrochemicals, which have long-term supply and cost issues.

Therefore, there is a considerable effort underway to find biologically-derived and sustainable sources of thermoplastic resins. These bio-derived polymers are more sustainable, because they are derived from renewable sources and can be made from domestically produced monomers. Preferably, these polymers are also biodegradable or compostable to resolve the disposal dilemma.

Polylactic acid, also known as polylactide or PLA, has been explored as a thermoplastic resin from biologically sustainable origins. The visual transparency and compostability of PLA make it an attractive material for film-based applications, such as retail and food packaging. However, PLA has a high transition glass temperature of about 60° C., which correlates to a rigid and glassy state of the polymer in an ambient temperature range. As a result, PLA does not provided the flexibility desired for most packaging applications.

Attempts to add plasticizers to increase PLA's flexibility have provided only marginal improvement, and may be even counterproductive, sometimes causing the composition to transform from an amorphous to a crystalline state, which is typically more rigid and brittle.

SUMMARY OF THE INVENTION

What is needed in the art is a compound having a significant component of bio-base content and a glass transition temperature lower than the glass transition temperature of PLA, while maintaining clarity. The present invention discloses the synthesis of a polyvinyl butyral-g-polylactide copolymer. After synthesis, this graft copolymer can be melt mixed with other ingredients to form a thermoplastic compound that can then be formed into a clear article, including films, sheets, fibers or tapes having a significant component of the material being bio-based. "Significant component" means that PLA is present in at least about thirty weight percent (30 wt %) of the compound.

The copolymer of the present invention is an in-situ reaction product of polyvinyl butyral and lactide monomer polymerized on to the backbone of polyvinyl butyral to form polylactic acid grafts in presence of a catalyst, optionally plasticizer, and optionally chain extender. Preferably, the in-situ polymerization occurs using reactive extrusion. Preferably the copolymer and compounds made therefrom have a glass transition temperature of about 50° C. and less, more preferably about 40° C. and less, and most preferably about 24.5° C. (i.e. ambient temperature) or less.

One aspect of the invention is a copolymer of polyvinyl butyral-g-polylactide, especially one which comprises random repeating units of:

wherein x ranges from about 250 to about 2000; wherein y'+z' ranges from about 100 to about 1200; wherein w ranges from 0 to about 100, and wherein "n" ranges from about 2 to about 10 and preferably about 3 to about 4. It is important to note that the grafting of lactide monomer may not occur at every possible vinyl alcohol site of the polyvinyl butyral backbone. For that reason, the number of y' and z' moieties in the copolymer are aggregated to range from about 100 to 1200.

Once the copolymer is synthesized, it can be used as a masterbatch for rendering flexibility to PLA or as the polymer matrix in a fully formulated polymer compound. Because the PVB backbone imparts flexibility to the various PLA grafts, any amount of flexibility can be established for a PLA-based polymer compound, depending on whether the copolymer of the present invention is the polymer matrix or blended with PLA to be within the PLA-based polymer compound.

EMBODIMENTS OF THE INVENTION

Polyvinyl Butyral (PVB) Resin

Polyvinyl butyral (PVB) is a flexible polymeric material used in many applications, such as for the laminates in safety glass or as a binder for ceramic and composite fibers. PVB is an acetal formed from the reaction of polyvinyl alcohol (PVA) with butyraldehyde. The conditions of the acetal reaction forming PVB can be closely controlled to form polymers containing specific proportions of hydroxyl 5-35%, acetate 0-10% and butyral 55-95% groups at specific molecular weights.

As further explained by Eastman Chemical Company, maker of Butvar® PVB of various grades, acetals, such as polyvinyl butyral, are formed by the well-known reaction between aldehydes and alcohols. The addition of one molecule of an alcohol to one molecule of an aldehyde produces a hemiacetal. Hemiacetals are rarely isolated because of their inherent instability but, rather, are further reacted with another molecule of alcohol to form a stable acetal.

Polyvinyl acetals are prepared from aldehydes and polyvinyl alcohols. Polyvinyl alcohols are high molecular weight resins containing various percentages of hydroxyl and acetate groups produced by hydrolysis of polyvinyl acetate.

The conditions of the acetal reaction and the concentration of the particular aldehyde and polyvinyl alcohol used are closely controlled to form polymers containing predetermined proportions of hydroxyl, acetate, and acetal groups. The final product may be represented by the following stylized structure.

PV Butyral

PV Alcohol

PV Acetate

The proportions of A, B, and C groups are controlled, and they are randomly distributed along the macromolecule. In the commercial grades of Butvar® PVB, the PV Butyral (vinyl butyral monomer) can range from about 80 to about 88 weight percent; the PV Alcohol (vinyl alcohol monomer) can range from about 11 to about 20 weight percent; and the PV Acetate (vinyl acetate monomer) can range from about 0 to about 2.5 weight percent.

PVB has a molecular weight between about 40,000 g/mole to about 250,000 g/mole. Preferred for the present invention is PVB having a molecular weight between about 120,000 g/mole to about 250,000 g/mole.

PVB is commercially available from several chemical manufacturers, including Kuraray and Eastman. Any grade of PVB can be used for the present invention; however, grades containing post-consumer recycled content are preferred for sustainability reasons. The PVB resin can also be combined with plasticizers, such as triethylene glycol bis (2-ethylhexanoate) used in SharkPowder™ manufactured by and Shark Solutions, LLC.

While there presently is no known bio-based PVB grade commercially available, this invention specifically contemplates the use of bio-based PVB in the copolymer of the invention because of the desire to have a fully bio-based copolymer for environmental sustainability reasons.

Lactide Monomer

One of the primary methods of synthesizing PLA is from the ring opening polymerization of lactide monomer. Lactide is a natural and renewable compound produced from lactic acid, which is made from the fermentation of sucrose or glucose. Lactides are cyclic diesters of lactic acid (2-hydroxypropionic acid) with the chemical formula $C_6H_8O_4$. Because lactic acid has two stereoisomeric forms (L(+)lactic acid and D(−)lactic acid), lactides can exist in three stereoisomeric forms: L-lactide. D-lactide and Meso-lactide. The most common naturally 6lsevier6 isomer of lactic acid is L-lactic acid.

A selection of lactide monomers consisting of L-lactide, D-lactide, Meso-lactide, or any combination. However, L-lactide (CAS number 4511-42-6) is preferred, due its lower cost. L-lactide has a molecular weight of about 144.13 g/mole and melting point temperature I between 95° C. and 97° C. Homopolymerization of L-lactide yields poly(L-lactide) (also referred to as PLLA), which is about 37% crystalline and has a melting point of between about 175° C. to about 178° C., and a glass transition temperature of about 50° C. to about 65° C.

L-lactide is commercially available globally from several manufacturers, including: Corbion Purac; NatureWorks. LLC; and Futerro.

Polymerization Catalyst

Any catalyst known by persons skilled in the art for polymerizing lactide monomers to form PLA can be used for the present invention. The most commonly used catalysts are based on metals such as tin, aluminum, zinc and titanium. Preferred as a polymerization catalyst for the present invention is tin (II) 2-ethylhexanoate, CAS number 301-10-0, having a molecular weight of 405.12 g/mole. This catalyst is preferred because of its high reaction rates, solubility in the monomer melt, and ability to produce high molecular weight PLA. Depending on the other reaction conditions the catalyst can also help drive transesterification between hydroxyl groups on the polyvinyl butyral with ester groups on the lactide.

Polymerization catalysts are available from several suppliers including Arkema and Reaxis.

Optional Chain Extending Agents

Optionally, one can increase physical performance of the copolymers and compounds of the present invention by adding a chain extending agent. Any chain extender that increases the molecular weight of the copolymer is suitable for use in the present invention. Increased molecular weight distribution ($M_n/M_w$) can increase tensile strength as well as tear resistance in sheets or other materials made from the copolymer and its compounds.

The chain extender can be added (i) during the reaction of the polyvinyl butyral and lactide monomer polymerized to form polylactide, or (ii) in a subsequent reaction after the copolymer is made. It is preferred to add the chain extender (i) during the reaction, because this results in a co-polymer having a higher molecular weight distribution.

Non-limiting examples of chain extending agents are carbodiimides, carbodiimide hydrochlorides, multi-functional epoxies, carbonylbiscaprolactames, multi-functional acrylic oligomers (such as Cesa-extend brand oligomers from Clariant Additive Masterbatches of Winchester. Va., USA), Addico 9300 and Addico 9302 styrene-acrylate-glycidyl methacrylate polymers from Rheomod de Mexico of Mexico City, and an epoxy-functional styrene-acrylate oligomer marketed by BASF Corporation as Joncryl® brand chain extender.

An epoxy-functional styrene-acrylate oligomer, such as Joncryl®, is preferred. Epoxy-functional styrene-acrylate oligomers are the polymerization product of (i) at least one epoxy-functional (meth)acrylic monomer; and (ii) at least one styrenic and/or (meth)acrylic monomer, wherein the polymerization product has an epoxy equivalent weight of from about 180 to about 2800, a number-average epoxy functionality (Efn) value of less than about 30, a weight-average epoxy functionality (Efw) value of up to about 140, and a number-average molecular weight (Mn) value of less than 6000. Preferably, the oligomeric chain extender has a polydispersity index of from about 1.5 to about 5. Additional information about the epoxy functional low molecular weight styrene-acrylate copolymer is disclosed in U.S. Pat. No. 6,605,681 (Villalobos et al.) and U.S. Pat. No. 6,984,694 (Blasius et al.), incorporated by reference herein.

Various Joncryl® grades available and useful from BASF are ADR-4300, ADR-4368-C, ADR-4370-S, and ADR-4368-C, which are all solids. Alternatively, one can use liquid grades, namely: ADR-4380, ADR-4385, and ADR-4318.

Particularly preferred is Joncryl® ADR-4368. The number average molecular weight of this grade is less than 3000 with approximately more than 4 epoxy functionalities per polymer chain.

Compounds

The copolymers described above can be useful without the addition of other ingredients. However, more often these copolymers can be more useful if mixed by dry blending or melt mixing with other ingredients, including functional additives, to form thermoplastic compounds having the bio-derived properties of the copolymer as well as functional properties of specific additives.

Optional Plasticizers

Any plasticizer known by persons skilled in the art for use with PVB or PLA can be used for the present invention to increase the flexibility of the compound. Frequently used plasticizers are phthalates, trimelliates, adipates, sebacates, maleates, epoxidized fatty acids, sulfonamides, organophosphates, polyethers, or combinations of one or more thereof. Examples of these types of plasticizers, include, but are not limited to, bis(2-ethylhexyl)phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate, trimethyl trimellitate, tri-(2-ethylhexyl)trimellitate, tri-(n-octyl, n-decyl)trimellitate, tri-(heptyl,nonyl)trimellitate, n-octyl trimellitate, bis(2-ethylhexyl)adipate, dimethyl adipate, monomethyl adipate, dioctyl adipate, dibutyl sebacate, dibutyl maleate, diisobutyl maleate, benzoate, N-ethyl toluene sulfonamide. N-(2-hydroxypropyl)benzene sulfonamide, N-(n-butyl)benzene sulfonamide, tricresyl phosphate, tributyl phosphate, triethylene glycol dihexanoate, tetraethylene glycol diheptanoate, citrate esters, methionine derivative esters, or combinations of two or more thereof. In addition, the furfuryl-based esters described in WO2014093624 can be used alone or in combination with the above plasticizers. Preferred for the present invention is triethylene glycol his (2-ethylhexanoate), a component of the Sharkpowder™ PVB resin compound.

Optional Partitioning Agents and Surfactants

Moisture can negatively impact the reactive extrusion process of the present invention or can cause the material to stick after extrusion. Therefore, the lactide monomer and PVB are preferably dried before use. Partitioning agents can also be added after extrusion of the copolymer to prevent sticking. Partitioning agents can include, for example, calcium stearate, calcium carbonates, talc, silica, or waxes such as the brand Acrawax-C® from Lonza. In addition, surfactants that are water dispersible, such as Microthene® from Equistar, can be used in the cooling baths to prevent sticking following extrusion. Additionally, release agents can be used, such as glycerol monostearate (Glycolube® 110, CAS number 31566-31-1); and pentaerythritol tetrastearate (Glycolube® P(ETS)).

Optional Additives

The compound of the present invention can include conventional plastics additives in amounts sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Libra10lseviervier.com), can select from many different types of additives for inclusion into the compounds of the present invention.

Non-limiting examples of optional additives include adhesion promoters; biocides; antibacterials; fungicides; mildewcides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; glycidyl methacrylate; branching agents, and combinations of them.

Table 1 shows acceptable, desirable, and preferable ranges of ingredients useful in the present invention, all expressed in weight percent (wt. %) of the entire copolymer or compound, respectively. The copolymer or compound, respectively, can comprise, consist essentially of, or consist of these ingredients.

Any number between the ends of the ranges is also contemplated as an end of a range, such that all possible combinations are contemplated within the possibilities of Table 1 as candidates for use in this invention. Unless expressly stated otherwise, any disclosed number is intended to refer to exactly the disclosed number. "about" the disclosed number, or both exactly the disclosed number and "about" the disclosed number.

TABLE 1

| Constituents of Copolymer and Compound | | | |
|---|---|---|---|
| | Acceptable | Desirable | Preferable |
| Polyvinyl butyral-g-polylactide copolymer | | | |
| Polyvinyl butyral (PVB) | 5-80 | 10-50 | 20-40 |
| Lactide monomer | 20-90 | 30-70 | 40-60 |
| Tin(II) 2-ethylhexanoate, catalyst | 0.5-2 | 0.5-1.5 | 0.5-1 |
| Optional chain extender | 0-15 | 1-10 | 2-5 |
| Compound | | | |
| Polyvinyl butyral-g-polylactide copolymer | 20-99 | 45-95 | 65-95 |
| Optional PLA polymer | 0-80 | 0-50 | 0-30 |
| Optional plasticizer | 0-50 | 5-40 | 5-30 |
| Optional chain extender | 0-15 | 0-10 | 0-5 |
| Optional partitioning agent | 0-5 | 0-3 | 0-2 |
| Optional additives | 0-20 | 0-15 | 0-5 |

Processing

The copolymer can be synthesized in batch or continuous conditions. Continuous conditions are preferable for productivity reasons.

The copolymer is synthesized via in-situ polymerization, in the presence of or absence of additional ingredients. Of the possible processing methods, in-situ polymerization via reactive extrusion is most preferred.

Reactive extrusion describes a process in which during the melt mixing of the ingredients, there is a planned chemical reaction that occurs. Typically reactive extrusion uses a continuous extruder-reactor having mixing capabilities at the molecular level. The extruder can be a twin screw extruder, either co-rotating or counter-rotating and have a screw diameter ranging from 16 mm to 45 mm.

Figure 1:
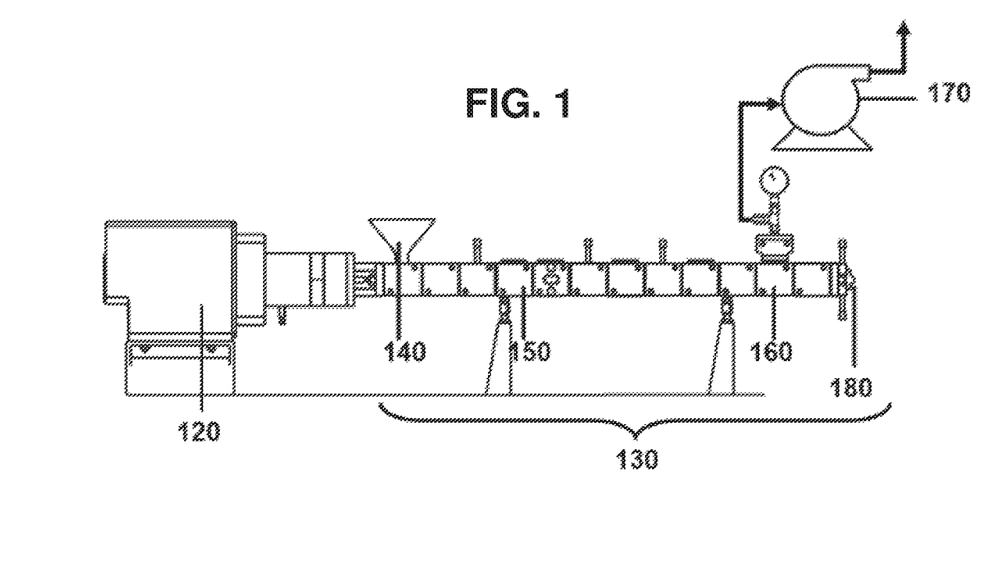
FIG. 1 is a schematic view of the reactive extrusion process of the invention.

FIG. 1 provides a schematic view of the reactive extrusion method useful for the present invention.

The extruder 100 has a series of heated zones 130 which can number more than six and usually eight or nine, allowing the establishment of different temperatures associated with different segments of screws (not shown) propelling the molten ingredients through the extruder and encountering other ingredients in conditions ripe for the planned reaction. FIG. 1 shows twelve zones 130 for extruder 100.

Among the series of zones is a first unheated or cooled zone or throat 140 of the extruder, into which the initial ingredients are added. Melt-mixing and the planned reaction begins by zone 150, until an evacuation zone 160 is reached further downstream. Zone 160 can be connected to a source of vacuum power 170 to vent any volatiles, such as water or steam. The melted, mixed, and reacted product of the extruder 100 is extruded through a die 180, for further processing such as pelletizing for later melt-mixing or reaction.

Typically, the temperature remains the same or increases for the sequential zones, until the die zone 180, at which the same or slightly lower temperature prepares the extrudate for exit from the extruder and cooling into strands, pellets, etc. Those skills in the art will know various pelletization and classification techniques; as well as drying and product packaging methods.

The average reactive extrusion temperature can range from about 195° C. to about 355° C. Moreover, within the average temperature, each of the zones can have a different temperature.

Subsequent extrusion or molding techniques are well known to those skilled in the art of thermoplastics polymer engineering. Without undue experimentation but with such references as "Extrusion. The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

USEFULNESS OF THE INVENTION

PVB-g-PLA copolymers, and the compounds made from them, can be used to meet consumer demand for products made from materials having a significant bio-based component. In addition these materials can be used to produce articles that can be composted following the end of their useful life.

The PVB-g-PLA copolymers and compounds of the present invention are particularly useful in material applications that require transparency, flexibility and ductility. Plastic articles made from PVB-g-PLA copolymers or compounds can be shaped via molding, extruding, calendering, thermoforming, and 3D printing for use in the transportation, appliance, electronics, building and construction, biomedical, packaging, and consumer markets.

Films and sheets are particularly useful thermoplastic articles. Clear and flexible films of PVB-g-PLA copolymers or compounds can be employed as films or sheets in the packaging industry for articles such as merchandise bags, trash bags, food mulch film, food packaging, non-food packaging, and fruit netting/fiber.

The examples provide data demonstrating the unpredictability of this invention.

EXAMPLES

To demonstrate the invention, the results of six experimental groups are provided below. The first experimental group (Experiment Group I) blended pre-existing polyvinyl butyral and pre-existing polylactide polymer resins. The second experimental group (Experimental Group II) blended polyvinyl butyral and polylactide polymer resins and also added a catalyst to drive a transesterification reaction between the polyvinyl butyral and polylactide polymers. The third experimental group (Experimental Group III) conducted an in-situ polymerization of lactide monomer in the presence of polyvinyl butyral resin containing plasticizer. The fourth experimental group (Experimental Group IV) conducted an in-situ polymerization of lactide monomer in the presence of polyvinyl butyral resins having different molecular weights. The fifth experimental group (Experimental Group V) conducted an in-situ polymerization of different combinations of D- and L-lactide monomer in the presence of polyvinyl butyral resin. The sixth experimental group (Experimental Group VI) added a chain extender during the in-situ polymerization of lactide monomer with polyvinyl butyral resin for the first subset, or subsequently to the reaction product of the in-situ polymerization of lactide monomer in the presence of polyvinyl butyral resin for the second subset. Finally, a lone experiment (Experimental Group VII) of in-situ polymerization using mesolactide was performed.

Test Methods

Transparency, flexibility and ductility are important characteristics for many film-based applications.

To determine the transparency of the examples, sample films having a thickness of 0.5 mm were visually evaluated according to the chart below.

TABLE 2

| Transparency Level | Description |
| --- | --- |
| Clear | The film of about 0.5 mm thickness transmits visible light from behind a viewer through the film's entire thickness so that an object having printed words of about 12 point font situated on the opposite side from the viewer by about 10 cm can have such words of 12 point font be distinctly seen by the viewer. |
| Hazy | The film of about the same 0.5 mm thickness diffuses or scatters visible light from behind a viewer through the film's entire thickness so that an object having printed words of about 12 point font situated on the opposite side of the viewer by about 10 cm cannot have such words of 12 point font be distinctly seen by the viewer. |

TABLE 2-continued

| Transparency Level | Description |
| --- | --- |
| Opaque | The film of about the same 0.5 mm thickness does not allow visible light from behind a viewer to pass through its thickness so that an object having printed words of about 12 point font situated on the opposite side of the viewer by about 10 cm cannot be seen at all. |

To determine the flexibility and ductility of the examples, a drape test was conducted on sample strands having a diameter of about 2 mm to about 3 mm that emerged from the extruder prior to becoming pelletized. The strand was positioned on a horizontal flat plane so that the length of 10 cm extended past the straight edge of the horizontal flat plane without any support but with 10 cm of strand remaining on the horizontal flat plane held down by manual force. The strands were then evaluated for flexibility according to Table 3 below for a period of time up to sixty (60) seconds. Ductility was also measured as described and reported in Table 3.

TABLE 3

| | Description |
| --- | --- |
| Flexibility | |
| Flexible | The portion of the strand extending beyond the straight edge bent at the straight edge at least 60 degrees from the horizontal flat plane under gravitational force after 60 seconds. |
| Rigid | The portion of the strand extending beyond the straight edge did not bend at the straight edge at least 60 degrees from the horizontal flat plane under gravitational force after 60 seconds. |
| Ductility | |
| Ductile | The strand of about 20 cm being held at its ends by opposing human hands could be deformed from its linear shape by at least 30 degrees without breaking as downward pressure was increasingly applied by both hands to the strand. |
| Brittle | The strand of about 20 cm being held at its ends by opposing human hands broke while being deformed from its linear shape before reaching 30 degrees as downward pressure was increasingly applied by both hands to the strand. |

In addition, examples were measured for glass transition temperature ($T_g$) by ASTM D7426 at heating/cooling rates of 20° C./minute, melting point ($T_m$) by ASTM D3418 at heating/cooling rates of 20° C./minute, tensile strength (psi) and strain at break (%) using ASTM D638, and tear resistance (lb.f/in) using ASTM D624.

The molecular weight parameters (number average molecular weight ($M_n$), weight average molecular weight ($M_w$) and molecular weight distribution ($M_w/M_n$)) for Examples 4, 19, 23 and 24 were tested using gel permeation chromatography (GPC). In the GPC test, samples were dissolved in tetrahydrofuran (THF) solvent and run twice as duplicates. Two control samples were run as a reference. Polystyrene was used as the standard and a refractive index detector obtained the relative molecular weight to polystyrene standards. The molecular weights of the Butvar® resins were obtained from the product technical data sheets.

Ingredients Used

The list of ingredients for Experimental Groups I-VI is shown in Table 4 below.

TABLE 4

| Brand Name | Ingredients | Purpose | Commercial Source |
| --- | --- | --- | --- |
| PLA 4060D | Polylactic acid (PLA) | Polymer resin | NatureWorks |
| PURASORB ® L | L-lactide monomer | Monomer | PURAC |
| PURALACT ® D | D-lactide monomer | Monomer | PURAC |
| Ingeo ™ M700 | Meso-lactide monomer | Monomer | NatureWorks LLC |
| SharkPowder ™ | Comprised of ~53% polyvinyl butyral (PVB) resin and ~37% plasticizer, triethylene glycol bis(2-ethylhexanoate) | Polymer resin | Shark Solutions |
| Butvar ® | Polyvinyl butyral | Polymer resin | Eastman Chemical |
| | Tin(II) 2-ethylhexanoate | Catalyst | Sigma Aldrich |
| TYZOR ® TOT Organic Titanate | Titanium(IV) 2-ethylhexyloxide | Catalyst | Dorf Ketal |
| Joncryl ® ADR-4368-C | Epoxy-functional styrene-acrylate oligomer | Chain extender | BASF Corporation |

For Experimental Group I. PVB and polylactide polymer resins were blended during extrusion into a mixture according to the conditions shown in Table 5-1.

For Experimental Group II, PVB and polylactide polymer resins were catalyzed during a reactive extrusion process to undergo a transesterification reaction according to the conditions shown in Table 5-1. Tin(II) 2-ethylhexanoate or titanium(IV) 2-ethylhexyloxide was used to catalyze the transesterification between hydroxyl groups on the PVB with ester groups on the polylactide.

For Experimental Group III, a PVB polymer compound containing the plasticizer, triethylene glycol bis(2-ethylhexanoate), was reacted with L-lactide monomer in the presence of the catalyst, tin(II) 2-ethylhexanoate, during a reactive extrusion process that included in-situ polymerization of the lactide monomer into polylactide according to the conditions shown in Table 5-2.

For Experimental Group IV, PVB polymer resins having different molecular weights were reacted with L-lactide monomer in the presence of tin(II) 2-ethylhexanoate during a reactive extrusion process that included in-situ polymerization of the lactide monomer into a polylactide polymer according to the conditions shown in Table 5-2.

For Experimental Group V, PVB polymer resin was reacted with combinations of L- and D-lactide monomers in the presence of tin(II) 2-ethylhexanoate during a reactive extrusion process that included in-situ polymerization of the lactide monomers into a polylactide polymer according to the conditions shown in Table 5-2.

For Subset 1 of Experimental Group VI, the chain extender was reacted with the reaction product from Example 4 of Experimental Group III according to Table 5-1. For Subset 2 of Experimental Group VI, at the beginning of the reactive extrusion process according to the conditions shown in Table 5-2 with the chain extender added with the other ingredients at the hopper.

For Experimental Group VII, PVB polymer resin was reacted with meso-lactide monomer in the presence of tin(II) 2-ethylhexanoate during a reactive extrusion process that included in-situ polymerization of the meso-lactide monomer into a polylactide polymer according to the conditions shown in Table 5-2.

TABLE 5-1

| Extruder Conditions | |
|---|---|
| Extruder Type | 16 mm screw extruder |
| Order of Addition | All ingredients mixed together and fed into the extruder hopper. |
| Zone 1 | 200° C. |
| Zone 2 | 200° C. |
| Zone 3 | 200° C. |
| Zone 4 | 200° C. |
| Zone 5 | 200° C. |
| Zone 6 | 200° C. |
| Zone 7 | 200° C. |
| Zone 8 | 200° C. |
| Zone 9 | 200° C. |
| Die | 190° C. |
| RPM | 200~300 |

TABLE 5-2

| Extruder Conditions | |
|---|---|
| Extruder Type | 16 mm screw extruder |
| Order of Addition | All ingredients mixed together and fed into the extruder hopper. |
| Zone 1 | 20° C. |
| Zone 2 | 50° C. |
| Zone 3 | 210° C. |
| Zone 4 | 230° C. |
| Zone 5 | 230° C. |
| Zone 6 | 210° C. |
| Zone 7 | 210° C. |
| Zone 8 | 205° C. |
| Zone 9 | 210° C. |
| Die | 150° C. |
| RPM | 25~500 |

Because moisture significantly affects the polymerization of lactide monomer to polylactide, the PVB resin was pre-dried overnight at 80° C. for Experimental Groups III-VII. The lactide monomer was used immediately after opening the aluminized bag that it was received in to avoid the accumulation of moisture. The lactide was pre-mixed with the catalyst and fed into the extruder with a powder form of PVB.

After extrusion the samples of Experimental Groups I-VII went through a water bath and were pelletized. The resulting 3 mm pellets were then compression molded at 360° F. between two Mylar® films at 300 psi for 30-60 seconds to a thickness of 0.5 mm.

Table 6 shows the recipes and test results for Experimental Groups I-VII.

TABLE 6

| | | Experimental Group I | | | | | |
|---|---|---|---|---|---|---|---|
| | | Example | | | | | |
| | | Control-1 (C-1) | Control-2 (C-2) | A | B | C | D |
| Ingredients (by wt %) | | | | | | | |
| | PLA 4060D | | 100.0 | 90.0 | 80.0 | 70.0 | 30 |
| SharkPowder ™ | PVB resin | 63.0 | | 6.3 | 12.6 | 18.9 | 44.1 |
| | triethylene glycol bis(2-ethylhexanoate) | 37.0 | | 3.7 | 7.4 | 11.1 | 25.9 |
| | Total | 100.0 | 100.0 | 100.0 | 100.0 | 100.0 | 100.0 |
| Test Results | | | | | | | |
| | $T_g$ (° C.) | 21.0 | 60.4 | 57.6 | 53.5 | 51.1 | 42.9 |
| | $T_m$ (° C.) | None | None | None | None | None | None |
| | Appearance | Clear | Clear | Opaque | Opaque | Opaque | Opaque |
| | Flexibility | Flexible | Rigid | Rigid | Rigid | Rigid | Rigid |
| | Ductility | Ductile | Ductile | Ductile | Ductile | Ductile | Ductile |
| After heat aging for 1 week at 80° C. | | | | | | | |
| | $T_g$ (° C.) | 20.6 | 56.7 | 50.1 | 55.6 | 44.3 | 53.8 |
| | $T_m$ (° C.) | None | 150.1 | 113.5 | 114.3 | 114.1 | 114.4 |
| | Appearance | Clear | Opaque | Opaque | Opaque | Opaque | Opaque |
| | Flexibility | Flexible | Rigid | Rigid | Rigid | Rigid | Rigid |
| | Ductility | Ductile | Ductile | Ductile | Ductile | Ductile | Ductile |

TABLE 6-continued

Experimental Group II

| Example | | E | F | G | H | I | J | K |
|---|---|---|---|---|---|---|---|---|
| Ingredients (by wt %) | | | | | | | | |
| | PLA 4060D | 79.5 | 69.5 | 59.5 | 49.5 | 39.5 | 59.5 | 49.5 |
| SharkPowder ™ | PVB resin | 12.6 | 18.9 | 25.2 | 31.5 | 37.8 | 25.2 | 31.5 |
| | triethylene glycol bis(2-ethylhexanoate) | 7.4 | 11.1 | 14.8 | 18.5 | 22.2 | 14.8 | 18.5 |
| Tin(II) 2-ethylhexanoate | | 0.5 | 0.5 | 0.5 | 0.5 | 0.5 | | |
| Titanium(IV) 2-Ethylhexyloxide | | | | | | | 0.5 | 0.5 |
| Total (wt %) | | 100.0 | 100.0 | 100.0 | 100.0 | 100.0 | 100.0 | 100.0 |
| Test Results | | | | | | | | |
| Appearance | | Opaque | Opaque | Opaque | Opaque | Opaque | Opaque | Opaque |
| Flexibility | | Rigid | Rigid | Rigid | Rigid | Rigid | Rigid | Rigid |
| Ductility | | Ductile | Ductile | Ductile | Ductile | Ductile | Ductile | Ductile |

Experiments Group III

| Examples | | 1 | 2 | 3 | 4 | 5 | 6 | 7 |
|---|---|---|---|---|---|---|---|---|
| Ingredients (by wt %) | | | | | | | | |
| | L-lactide | 89.5 | 79.5 | 69.5 | 59.5 | 49.5 | 39.5 | 29.5 |
| SharkPowder ™ | PVB resin | 6.3 | 12.6 | 18.9 | 25.2 | 31.5 | 37.8 | 44.1 |
| | triethylene glycol bis(2-ethylhexanoate) | 3.7 | 7.4 | 11.1 | 14.8 | 18.5 | 22.2 | 25.9 |
| Tin(II) 2 ethylhexanoate | | 0.5 | 0.5 | 0.5 | 0.5 | 0.5 | 0.5 | 0.5 |
| Total | | 100.0 | 100.0 | 100.0 | 100.0 | 100.0 | 100.0 | 100.0 |
| Test Results | | | | | | | | |
| $T_g$ (° C.) | | 46.1 | 38.1 | 32.6 | 24.5 | 17.5 | 13.9 | 11.5 |
| $T_m$ (° C.) | | None | None | None | None | None | None | None |
| Appearance | | Clear | Clear | Clear | Clear | Clear | Clear | Clear |
| Flexibility | | Rigid | Rigid | Rigid | Flexible | Flexible | Flexible | Flexible |
| Ductility | | Brittle | Brittle | Ductile | Ductile | Ductile | Ductile | Ductile |
| After heat aging for 1 week at 80° C. | | | | | | | | |
| $T_g$ (° C.) | | 45.1 | 36.8 | 30.5 | 23.3 | 19.8 | 17.2 | 11.7 |
| $T_m$ (° C.) | | 140.9 | 122.8 | 112.7 | None | None | None | None |
| Appearance | | Hazy | Hazy | Hazy | Clear | Clear | Clear | Clear |
| Flexibility | | Rigid | Rigid | Rigid | Flexible | Flexible | Flexible | Flexible |
| Ductility | | Brittle | Brittle | Brittle | Ductile | Ductile | Ductile | Ductile |

Experimental Group IV

| Examples | | 8 | 9 | 10 | 11 | 12 | 13 |
|---|---|---|---|---|---|---|---|
| Ingredients (by wt. %) | Mw (×10³) | | | | | | |
| L-lactide | | 59.5 | 59.5 | 59.5 | 59.5 | 59.5 | 59.5 |
| Tin(II) 2-ethylhexanoate | | 0.5 | 0.5 | 0.5 | 0.5 | 0.5 | 0.5 |
| PVB Resins | | | | | | | |
| Butvar ® B-72 | 170-250 | 40.0 | | | | | |
| Butvar ® B-74 | 120-150 | | 40.0 | | | | |
| Butvar ® B-76 | 90-120 | | | 40.0 | | | |
| Butvar ® B-79 | 50-80 | | | | 40.0 | | |
| Butvar ® B-90 | 70-100 | | | | | 40.0 | |
| Butvar ® B-98 | 40-70 | | | | | | 40.0 |
| Total | | 100.0 | 100.0 | 100.0 | 100.0 | 100.0 | 100.0 |
| Test Results | | | | | | | |
| $T_g$ (° C.) | | 28.2 | 28.9 | 35.8 | 30.9 | 35.7 | 33.3 |
| $T_m$ (° C.) | | None | None | None | None | None | None |
| Appearance | | Clear | Clear | Clear | Clear | Clear | Clear |
| Flexibility | | Flexible | Flexible | Rigid | Rigid | Rigid | Rigid |
| Ductility | | Ductile | Ductile | Brittle | Brittle | Brittle | Brittle |
| After heat aging for 1 week at at 80° C. | | | | | | | |
| $T_g$ (° C.) | | 21.3 | 23.7 | 30.6 | 19.4 | 24.3 | 18.3 |
| $T_m$ (° C.) | | None | None | None | None | None | None |
| Appearance | | Clear | Clear | Clear | Clear | Clear | Clear |
| Flexibility | | Flexible | Flexible | Rigid | Rigid | Rigid | Rigid |
| Ductility | | Ductile | Ductile | Brittle | Brittle | Brittle | Brittle |

TABLE 6-continued

Experimental Group V

| | Example | 14 | 15 | 16 | 17 | 18 |
|---|---|---|---|---|---|---|
| Ingredients (by wt %) | | | | | | |
| | L-lactide | 59.5 | 59.5 | 59.5 | | 29.5 |
| | D-lactide | 2.0 | 5.0 | 10.0 | 59.5 | 30.0 |
| SharkPowder | PVB resin | 23.94 | 22.05 | 18.9 | 25.2 | 25.2 |
| | triethylene glycol bis(2-ethylhexanoate) | 14.06 | 12.95 | 11.1 | 14.8 | 14.8 |
| Tin(II) 2-ethylaexanoate | | 0.5 | 0.5 | 0.5 | 0.5 | 0.5 |
| | Total | 100.0 | 100.0 | 100.0 | 100.0 | 100.0 |
| | | *Test Results* | | | | |
| | $T_g$ (° C.) | 14.8 | 15.5 | 16.0 | 21.5 | 16.6 |
| | $T_m$ (° C.) | None | None | None | None | None |
| | Appearance | Clear | Clear | Clear | Clear | Clear |
| | Flexibility | Flexible | Flexible | Flexible | Flexible | Flexible |
| | Ductility | Ductile | Ductile | Ductile | Ductile | Ductile |
| *After heat aging for 1 week at 80° C.* | | | | | | |
| | $T_g$ (° C.) | 9.7 | 12.5 | 14.3 | 18.3 | 16.1 |
| | $T_m$ (° C.) | None | None | None | None | None |
| | Appearance | Clear | Clear | Clear | Clear | Clear |
| | Flexibility | Flexible | Flexible | Flexible | Flexible | Flexible |
| | Ductility | Ductile | Ductile | Ductile | Ductile | Ductile |

Experimental Group VI

| | | Example | | | | | | |
|---|---|---|---|---|---|---|---|---|
| | | 19 | 20 | 21 | 22 | Repeat of Example 4 | 23 | 24 |
| Ingredients (by wt %) | | | | | | | | |
| | L-lactide | | | | | 59.5 | 58.5 | 56.5 |
| Copolymer (Product of Example 4) | | 99.0 | 97.0 | 95.0 | 92.0 | | | |
| Joncryl ® 4368 | | 1.0 | 3.0 | 5.0 | 8.0 | | 1.0 | 3.0 |
| SharkPowder | PVB resin | | | | | 25.2 | 25.2 | 25.2 |
| | triethylene glycol bis(2-ethylhexanoate) | | | | | 14.8 | 14.8 | 14.8 |
| Tin(II) 2-ethylhexanoate | | | | | | 0.5 | 0.5 | 0.5 |
| | Total | 100.0 | 100.0 | 100.0 | 100.0 | 100.0 | 100.0 | 100.0 |
| | | *Test Results* | | | | | | |
| | $T_g$ (° C.) | 21.4 | 21.1 | 21.8 | 23.3 | 26.1 | 27.0 | 27.7 |
| | $T_m$ (° C.) | None | None | None | None | None | None | None |
| | Appearance | Clear | Hazy | Hazy | Opaque | Clear | Clear | Clear |
| | Flexibility | Flexible | Flexible | Flexible | Flexible | Flexible | Flexible | Flexible |
| | Ductility | Ductile | Ductile | Ductile | Ductile | Ductile | Ductile | Ductile |
| *After heat aging for 1 week at 80° C.* | | | | | | | | |
| | $T_g$ (° C.) | 22.4 | 23.1 | 22.7 | 24.6 | 25.8 | 26.8 | 25.6 |
| | $T_m$ (° C.) | None | None | None | None | None | None | None |
| | Appearance | Clear | Slightly Hazy | Hazy | Opaque | Clear | Clear | Clear |
| | Flexibility | Flexible | Flexible | Flexible | Flexible | Flexible | Flexible | Flexible |
| | Ductility | Ductile | Ductile | Ductile | Ductile | Ductile | Ductile | Ductile |
| | | *Physical Data* | | | | | | |
| Tensile Strength (psi) ASTM D638 | | Not tested | Not tested | Not tested | Not tested | 1032.2 | 1259.4 | 1254.9 |
| (Potential Deviation) | | | | | | (+/−176.8) | (+/−98.7) | (+/−141.7) |
| Strain at Break % ASTM D638 | | Not tested | Not tested | Not tested | Not tested | 160.2 | 123.5 | 125.5 |
| (Potential Deviation) | | | | | | (+/−29.8) | (+/−16.2) | (+/−19.0) |
| Tear Resistance (lb · f/in) ASTM D624 | | Not tested | Not tested | Not tested | Not tested | 375.5 | 458.6 | 586.2 |
| (Potential Deviation) | | | | | | (+/−13.0) | (+/−6.5) | (+/−12.8) |
| | | *Molecular Weight by GPC* | | | | | | |
| | $M_n$ (×10³) | 136.29 | Not tested | Not tested | Not tested | 154.49 | 101.94 | 81.99 |
| | $M_w$ (×10³) | 333.90 | Not tested | Not tested | Not tested | 430.95 | 405.49 | 440.65 |
| | $M_w/M_n$ | 2.45 | Not tested | Not tested | Not tested | 2.80 | 3.98 | 5.38 |

TABLE 6-continued

Experimental Group VII

| Examples | 25 | 26 |
|---|---|---|
| Ingredients (by wt %) | | |
| Meso-lactide | 59.5 | 56.5 |
| SharkPowder ™ PVB resin | 25.2 | 25.2 |
| triethylene glycol bis(2- ethylhexanoate) | 14.8 | 14.8 |
| Tin(II) 2 ethylhexanoate | 0.5 | 0.5 |
| Joncryl ® 4368 | | 3.00 |
| Total | 100.0 | 100.00 |
| Test Results | | |
| $T_g$ (° C.) | 13.9 | 14.2 |
| $T_m$ (° C.) | None | None |
| Appearance | Clear | Clear |
| Flexibility | Flexible | Flexible |
| Ductility | Ductile | Ductile |
| After heat aging for 1 week at 80° C. | | |
| $T_g$ (° C.) | 6.4 | 4.6 |
| $T_m$ (° C.) | None | None |
| Appearance | Clear | Clear |
| Flexibility | Flexible | Flexible |
| Ductility | Ductile | Ductile |

Experimental Group I demonstrates that although PVB and PLA, individually, were each clear (Control Examples C-1 and C-2 respectively), when blended the resulting mixture in Comparative Examples A-D were opaque due to the immiscibility of the polymer resins. In addition, the PVB/PLA blends of Experimental Group I were rigid, similar to the PLA material alone.

Experimental Group II grafted PVB and PLA via a transesterification reaction. Two different types of catalysts, tin(II) 2-ethylhexanoate and titanium(IV) 2-ethylhexyloxide, were tried to best optimize the reaction. However, Comparative Examples E-K were both opaque and rigid.

Surprisingly, however, when the PLA from Experimental Group II was replaced in Experimental Group III with a lactide monomer polymerized in the presence of PVB resin and catalyst, Examples 1-7 all resulted in clear films. Moreover, if there was a ratio of 5:2 or less lactide monomer to PVB the copolymer maintained its clarity, flexibility and ductility, even after heating at 80° C. for 1 week. Furthermore, the transition glass temperature for Examples 1-7 were as much as 73% lower compared to the comparable formulations using PLA in Experimental Group I, shown in the chart below.

| Comparison of Tg's of Ex. Group I vs. Ex. Group III | | | | |
|---|---|---|---|---|
| | A vs. 1 | B vs. 2 | C vs. 3 | D vs. 7 |
| % decrease $T_g$ | 20% | 29% | 36% | 73% |
| Δ $T_g$ | 11.5 | 15.4 | 18.5 | 31.4 |

Experimental Group IV followed same reaction process as Experimental Group III, except it was in the absence of plasticizer. This reaction also resulted in a clear copolymer material, Examples 8-13. In addition. Examples 8 and 9 revealed a higher molecular weight PVB resin, preferably from about 120,000 to about 250,000, leads to a lower transition glass temperature, and a copolymer that is flexible and ductile even after heating at 80° C. for 1 week.

Experimental Group V tested various combinations of D- and L-lactide ranging in a total amount of lactide monomer of 59.5% to 69.5% of the compound. Example 17 showed that when using only the D-lactide monomer the transition glass temperature was 21.5, slightly lower than when using only the L-lactide monomer in Example 4, but surprisingly Examples 14, 15, 16 and 18 using a combination of the L- and D-monomer all had $T_g$ temperatures of 16.6 or less. Examples 14-18 were also clear, flexible, and ductile and maintained their clarity and flexibility after aging at 80° C. for 1 week.

Experimental Group VI tested the addition of an epoxy-functional styrene-acrylate oligomer chain extender to increase the copolymer molecular weight. Examples 19-24 were both flexible and ductile, however, Examples 23 and 24 of Subset-2 where the chain extender was added during the polymerization of lactide monomer in the presence of PVB resin yielded a clear material. Examples 23 and 24 also obtained a higher molecular weight distribution compared to Example 4.

Experimental Group VII showed that the use of meso-lactide monomer to form PLA grafts on to PVB was successful, further expanding the scope of the present invention.

The above experiments demonstrate grafting PVB to fully-formed polylactide decreases transparency and has minimal impact lowering the $T_g$ and improving flexibility or ductility. On the other hand, when the lactide monomer is polymerized in the presence of PVB it results in a copolymer that is clear and has a glass transition temperature lower than a composition in which the lactide monomer is replaced with PLA.

Figure 2:
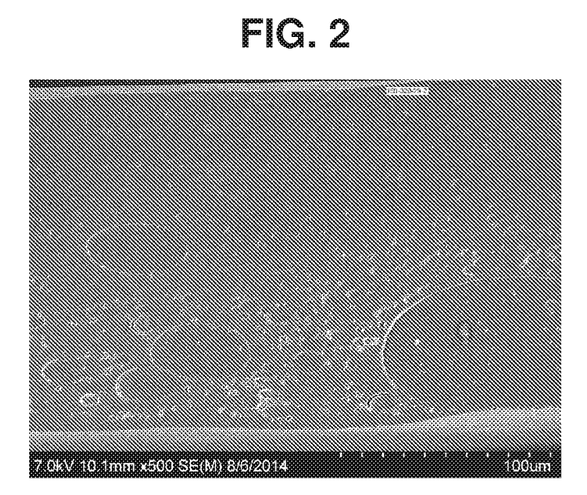
FIG. 2 is the view of Comparative Example C using Scanning Electron Microscopy (SEM) at 500× magnification.
Figure 3:
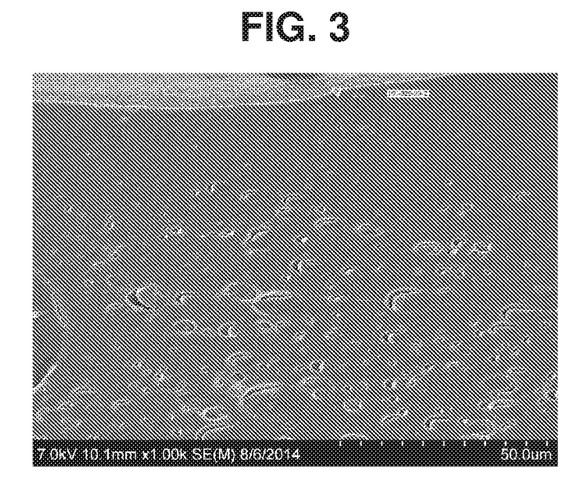
FIG. 3 is the view of Comparative Example C using SEM at 1,000× magnification.
Figure 4:
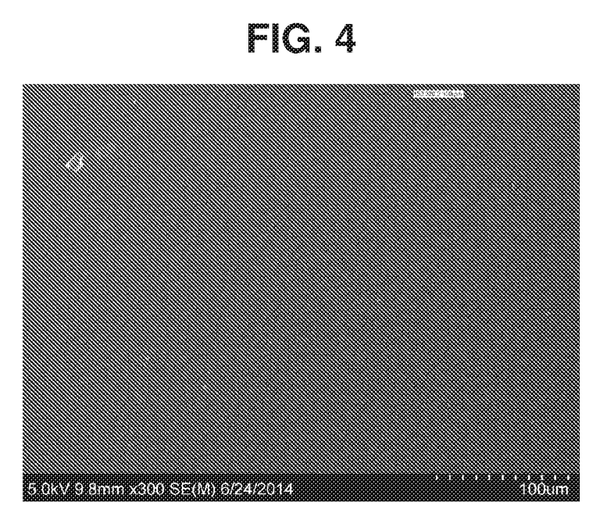
FIG. 4 is the view of Example 4 using SEM at 300× magnification.
Figure 5:
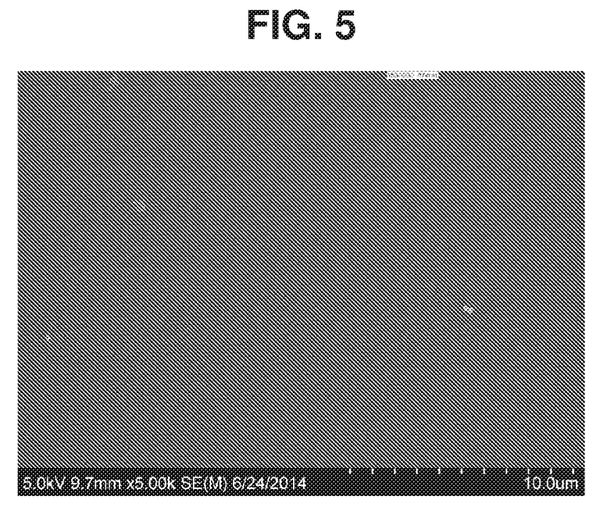
FIG. 5 is the view of Example 4 using SEM at 5,000× magnification.

While not being limited to a particular theory, it is believed that during the process for Experimental Groups III-VI, the lactide monomer first grafts to the PVB, before or concurrently with fully polymerizing to form PLA. As a result there is less steric hindrance from the lactide monomer (versus a PLA chain), so the lactide can react at more hydroxyl group sites on the PVB. Consequently, in Examples 1-24, the PLA and PVB components of the copolymer are better incorporated into a stable amorphous structure. In FIGS. 4 and 5, the SEM view of Example 4 at magnifications of 300× and 5.000× respectively, show a uniform and homogenous material. In contrast, the SEM view in FIGS. 2 and 3 of Comparative Example C at a magnification of 500× and 1,000× respectively, show the blend of PVB and PLA is not fully miscible and results in a heterogeneous material.

Reaction Sequence I below describes the reaction between the lactide monomer and PVB to form a graft copolymer in Examples 1-24.

Reaction Sequence I

The above reaction results in a polyvinyl butyral-g-polylactide co-polymer (or PVB-g-PLA copolymer), which is a branched copolymer of a backbone of the polyvinyl butyral and grafts of the polymerized lactide monomer. The copolymer includes random repeating units with x ranging from about 250 to about 2000, with w units ranging from 0 to about 100; and y'+z' random repeating units cumulatively ranging from about 100 to about 1200; and "n" ranging from about 2 to about 10, and preferably about 3 to about 4. It is important to note that the grafting of lactide monomer may not occur at every possible vinyl alcohol site of the polyvinyl butyral, but $C_{13}$ NMR evidence indicates that nearly every possible vinyl alcohol site is the subject of grafting of lactide moieties.

The number of units of w, x, and y in the polyvinyl butyral before the reaction with lactide monomers is determined by the commercial suppliers of polyvinyl butyral, as stated above. The percentage of y units in commercial PVB can range from about 5% to about 35%, and preferably from about 11 to about 20 weight percent of the PVB serving as the backbone for the graft copolymer. The percentage of w units in commercial PVB can range from 0 to about 2.5 weight percent. Using $C_{13}$ NMR, the percentage of w units was less than 3 mole percent.

The relative number of units of y' and z' (which added together equal the number of vinyl alcohol units (y) of the polyvinyl butyral) after the reaction with lactide monomers is determined by reaction kinetics of the reactive extrusion of polyvinyl butyral in the presence lactide monomer and catalyst.

As presently understood, a person having ordinary skill in the art of reactive extrusion will recognize that the resulting numbers of y' units and z' units can be affected by traditional reaction kinetic factors, including without limitation, ratio of reactants, timing of addition of the lactide monomer, screw speed, temperatures of various extruder zones, screw configurations, venting of volatile gases, and other polymer engineering factors.

Without being limited to a particular theory, it is believed that the percentage of grafted units (z') to original vinyl alcohol (y) units of the polyvinyl butyral in the exemplified copolymers ranges from about 98 percent to about almost 100 percent. The belief stated above is based on using $C_1$-NMR (nuclear magnetic resonance) which, in the 60-70 ppm range, it was found that there are very few if any remaining y' moieties after copolymerization, most likely less than two percent and perhaps less than one percent or even less than 0.5 percent or 0.1 percent. This vanishingly small amount of y' moieties in the copolymer demonstrates a nearly complete grafting of lactide monomers to every available vinyl alcohol site y along the PVB backbone.

Moreover, because of the vanishingly small amount of y' moieties remaining after grafting polymerization, the length of the graft (n) is also surprising. Again using $C_{13}$ NMR, it was determined that the number of n grafts is between 3 and 4, which matched the theoretical calculations made possible after learning about the vanishingly small value of y' from the prior NMR study.

With almost every vinyl alcohol site along the PVB backbone accepting a graft of lactide monomers and with every graft of lactide monomers being between 3 and 4 mer units in grafting length, the resulting copolymer can be called a comb polymer with a relatively longer backbone of PVB and many much shorter grafts of PLA to nearly each vinyl alcohol site on the backbone of nearly identical grafting length.

Consistency of grafting length is not merely aesthetically pleasing as is a pocket comb with equal length of teeth. The longer a graft of PLA, the more likely the chance for crystallization of PLA, a very undesired consequence for a flexible copolymer. Thus, not only does the copolymerization of PLA grafting onto PVB improve flexibility of the PLA, the nearly identical grafts of PLA on the PVB provides a consistent graft length with polymer physics advantages.

Therefore, the branched copolymer's architecture is that of a comb polymer molecule having a backbone of the polyvinyl butyral and grafts of the polylactide polymerized in situ during reactive extrusion conditions. The weight ratio of polyvinyl butyral to polylactide in the copolymer can range from about 1:18 to about 4:1. In this ratio statement, the weight of the vinyl alcohol portion of the grafted moiety z' is included with the polyvinyl butyral. Stated alternatively, the weight ratio range considers the weight of the original polyvinyl butyral backbone and the weight of the polylactide grafted to that backbone during in situ polymerization.

The copolymer can have a weight average molecular weight ($M_w$) from about 50,000 to about 1.000.000, preferably from about 100.000 to about 625.000, and more preferably from 350,000 to about 625,000.

The PVB-g-PLA copolymer is amorphous (versus crystalline), as evidenced by having no discernable melting temperature ($T_m$) measured by ASTM D3418 at heating/cooling rates of 20° C./minute. In addition, the copolymers in Examples 1-24 have a glass transition temperature ($T_g$) of between about 11° C. and about 46° C. measured by ASTM D7426 at heating/cooling rates of 20° C./minute.

Flexibility has been achieved for polylactic acid, not by plasticization using other chemicals but by lactide grafts onto flexible polyvinyl butyral. Moreover, the grafting of lactide monomer onto polyvinyl butyral achieves such flexibility, not merely melt mixing of the two polymers.

The invention is not limited to the above embodiments. The claims follow.

What is claimed is:

1. A copolymer of polyvinyl butyral-g-polylactide, wherein the copolymer is a reaction product of the polyvinyl butyral and lactide monomer polymerized to form polylactide in the presence of a catalyst, and wherein the weight ratio of polyvinyl butyral to polylactide ranges from about 1:18 to about 4:1.

2. The copolymer of claim 1, wherein the copolymer comprises random repeating units of:

wherein x ranges from about 250 to about 2000; wherein y'+z' ranges from about 100 to about 1200; wherein w ranges from 0 to about 100, and wherein n ranges from about 2 to about 10.

3. The copolymer of claim 1, wherein the copolymer is a branched polymer of a backbone of the polyvinyl butyral and grafts of the polylactic acid, and wherein the polylactic acid has from 3 to about 4 mer units of lactide monomer.

4. The copolymer of claim 1, wherein the polylactic acid has been polymerized from a selection of lactide monomers consisting of L-lactide, D-lactide, Meso-lactide, or any combination thereof.

5. The copolymer of claim 3, wherein the copolymer is a comb polymer of a backbone of the polyvinyl butyral and grafts of the polylactide of consistent length of about 3 to about 4 mer units of lactide per graft to vinyl alcohol sites of the polyvinyl butyral.

6. A thermoplastic compound, comprising the copolymer of claim 1, wherein the copolymer is an in-situ reaction product of polyvinyl butyral and lactide monomer polymerized on a backbone of the polyvinyl butyral to form grafts of polylactic acid in presence of a catalyst, optionally plasticizer, and optionally chain extender.

7. The compound of claim 6, wherein the compound comprises from about 25 to about 99 weight percent of the copolymer and from about 0 to about 50 weight percent of the plasticizer.

8. The compound of claim 6, wherein the copolymer is a reaction product of the polyvinyl butyral and the lactide monomer polymerized to form polylactide in the absence of plasticizer.

9. The compound of claim 6, wherein the copolymer in the compound has no discernible melting temperature ($T_m$) as measured by ASTM D3418 at heating/cooling rates of 20° C./minute.

10. The compound of claim 6, wherein the copolymer in the compound has a glass transition temperature ($T_g$) of between about 11° C. and about 46° C. as measured by ASTM D7426 at heating/cooling rates of 20° C./minute.

11. The compound of claim 6, wherein the compound comprises from about 45 to about 95 weight percent of the copolymer, and from about 0 to about 40 weight percent of plasticizer.

12. The compound of claim 6, wherein the polyvinyl butyral to lactide monomer weight ratio in the copolymer ranges from about 1:18 to about 4:1.

13. The compound of claim 6, wherein the copolymer in the compound has no discernible melting temperature ($T_m$) following extrusion and after 7 days of exposure to a temperature of 80° C. as measured by ASTM D3418 at heating/cooling rates of 20° C./minute.

14. The compound of claim 6, wherein the copolymer is a reaction product of the polyvinyl butyral and the lactide monomer polymerized to form polylactide in the presence of the chain extender epoxy-functional styrene-acrylate oligomer, and wherein tear resistance of the compound is greater than about 350 lbf/in as measured using ASTM D624.

15. The compound of claim 6, further comprising one or more functional additives selected from the group consisting of adhesion promoters; biocides; antibacterials; fungicides; mildewcides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; branching agents, and combinations of them.

16. A plastic article of the compound of claim 6.

17. The plastic article of claim 16, in a shape selected from the group consisting of film, sheet, pellet, fiber, molded part, extruded part, 3D printed part, and thermoformed part.

18. A method of making the copolymer of claim 1, comprising the step of in-situ polymerization of lactide monomer in presence of a catalyst and vinyl alcohol sites of polyvinyl butyral, wherein the catalyst drives polymerization of the lactide monomer to form polylactide grafts and transesterification between hydroxyl groups on the polyvinyl butyral with ester groups on the lactide monomer.

* * * * *